United States Patent
Gibbs et al.

(10) Patent No.: US 6,289,627 B1
(45) Date of Patent: Sep. 18, 2001

(54) FOLDING STOWABLE TROLLING RIG FOR MULTIPLE FISHING RODS

(76) Inventors: Louis L. Gibbs, 1469 Westlake Dr., Gainesville, GA (US) 30501; John A. Robinson, 3970 Bark Camp Pl.; George R. Davenport, 3405 Nancy Creek Rd., both of Gainesville, GA (US) 30506

( * ) Notice: Subject to any disclaimer, the term of this patent is extended or adjusted under 35 U.S.C. 154(b) by 0 days.

(21) Appl. No.: 09/431,592

(22) Filed: Nov. 1, 1999

Related U.S. Application Data

(60) Provisional application No. 60/107,084, filed on Nov. 5, 1998.

(51) Int. Cl.[7] .................................................. A01K 97/10
(52) U.S. Cl. ................................................................ 43/21.2
(58) Field of Search .......................... 43/21.2; 248/528, 248/529, 534

(56) References Cited

U.S. PATENT DOCUMENTS

| | | | |
|---|---|---|---|
| 2,196,472 | * | 4/1940 | Moriarity ............................... 43/21.2 |
| 3,060,614 | * | 10/1962 | Prince ....................................... 43/6.5 |
| 3,342,441 | * | 9/1967 | Danielson ............................. 248/529 |
| 3,564,751 | * | 2/1971 | Holiman ................................. 43/21.2 |
| 4,823,723 | * | 4/1989 | Brooks .................................. 114/343 |
| 4,869,195 | * | 9/1989 | Eichfeld ................................ 114/364 |
| 4,901,469 | * | 2/1990 | Murray ................................... 43/21.2 |
| 5,435,093 | * | 7/1995 | Minorics et al. ..................... 43/19.2 |
| 5,673,507 | * | 10/1997 | Stokes, Jr. ............................. 43/21.2 |
| 5,685,107 | * | 11/1997 | Sweet ................................... 43/21.2 |

* cited by examiner

*Primary Examiner*—Kurt Rowan

(57) ABSTRACT

A folding stowable trolling rig for removably mounting a plurality of fishing rods in desired, operable positions above the deck of a boat, such rig mounting atop a standard fishing seat pedestal of the type found on bass boats and requiring no tools or special hardware for installation. It is comprised of a plurality of longitudinally spaced rod holders pivotally mounted to a pair of folding support arms, one end of each being pivotally attached to either side of a central mounting base, the underside of which having a post that inserts into the seat mounting socket atop the fishing seat pedestal. Automatic alignment of each rod holder, both in folded and opened positions, is controlled by a pair of alignment bars pivotally mounted to the holders and to either side of the mounting base just above and parallel to the support arms. The rod holders and the support arms all fold together into compact alignment for transporting or stowing.

2 Claims, 5 Drawing Sheets

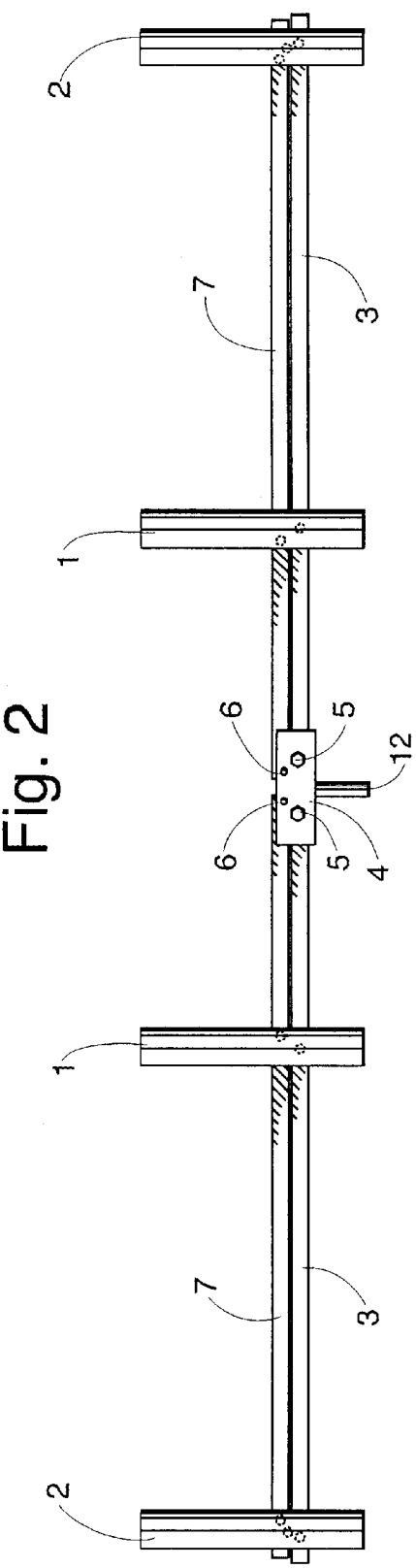
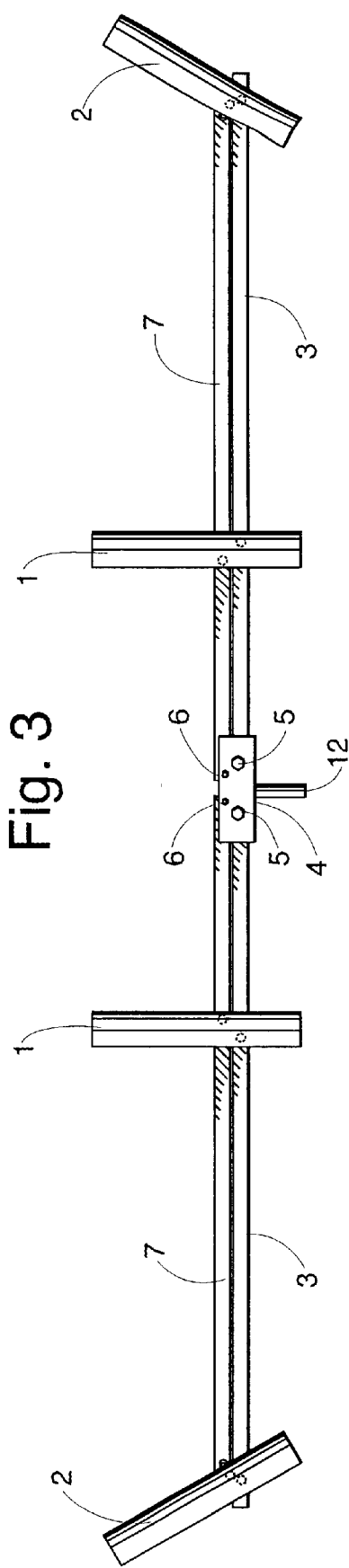
Fig. 2
Fig. 3

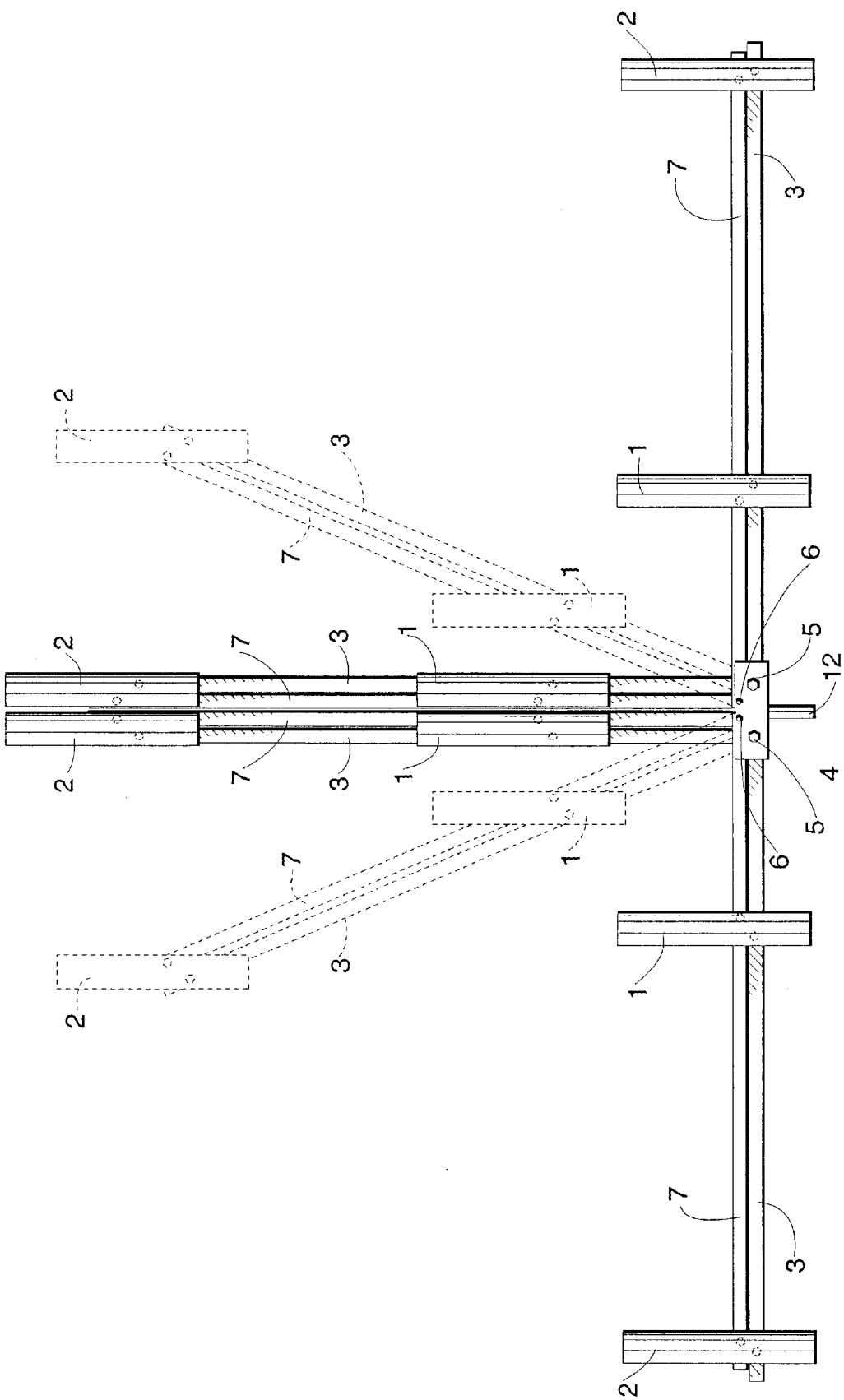

Fig. 7
Fig. 8
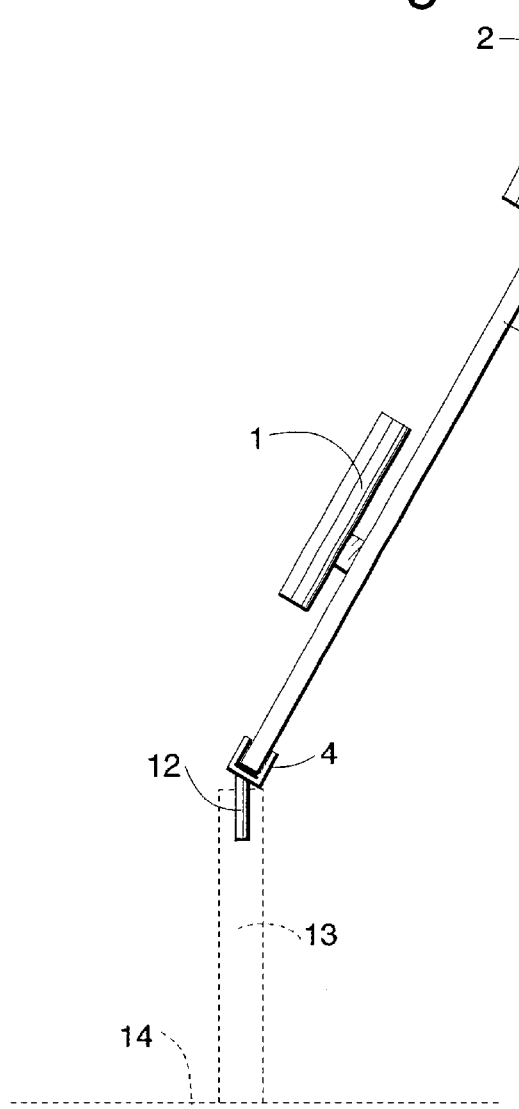
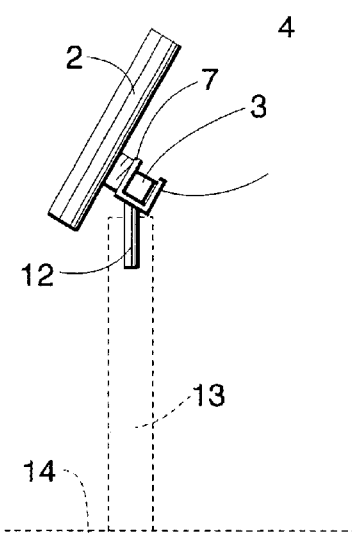

FOLDING STOWABLE TROLLING RIG FOR MULTIPLE FISHING RODS

CROSS-REFERENCE TO RELATED APPLICATIONS

Reference is made to Provisional Application No. 60/107,084 with Filing Date of Nov. 05, 1998, in the names of Gibbs, Robinson and Davenport as shown above, which is hereby made part of this nonprovisional application.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

This invention relates to a portable device for holding a plurality of fishing rods in the optimum position for fishing operations, and in particular to a device which removably mounts using standard marine fixtures of the type common to "bass boats" and readily folds into a compact form for stowing or carrying.

There have been a variety of devices proposed for the purpose of enabling the sport fisherman to utilize multiple fishing rods in fishing operations, such as trolling or live bait fishing. Presenting what appears to be a school of fish to a predator is an effective technique, improving the chance of getting a strike over using a single line. The use of multiple fishing rods, however, requires proper positioning, spacing, and tilt angle of the rod holders to not only minimize the chances of line entanglement, but to make it convenient to remove the rod quickly when there is a strike, and at the same time, difficult for the rod to fall out of the rod holder while under way. It can be seen then, that for a given number of rod holders on a common support device, there is an optimum configuration of placement and tilt angle of each holder to satisfy these requirements.

Other considerations come into play with the sport fisherman's use of such multiple rod holding devices, referred to herein as trolling rigs. One is that some of the time he may not desire or is not allowed to troll while fishing, such as during certain tournaments where it is against the rules, or when fishing for a particular species of fish that is best caught by casting. At such times it is desirable for the trolling rig to be stowed out of the way, yet be accessible should he desire to do some trolling the same day. Installation and removal of the rig should be quick and easy and it should become compact enough to fit into a typical storage compartment on the boat such as those designed for fishing rods or water skis. Another consideration is that installation of existing trolling rigs, ones that are wide enough to span the stern of the boat and accommodate the desired number of rod holders with proper lateral spacing, requires making holes in the sides or tops of the gunwales for the mounting hardware. Many types of boats that are used for fishing are not dedicated single purpose fishing boats and this permanent type of installation not only can reduce the resale value of the boat but also creates a possible source of water infiltration which can cause rot or other damage. In view of this, the last thing the owner of an expensive shiny new boat wants to do is start drilling holes in the fiberglass. He should be able to use a trolling rig with his boat, remove it, and keep it for his next boat without worrying about the loss of value by so doing.

To this end, installation ideally should require no tools and involve only the use of components and fixtures already existing on the boat, or involve the addition of a standard component designed for fishing boats, which can be added without adverse effects. It should be such a simple process, and the rig so easy to carry around, that the fisherman would not hesitate to take it off his boat and use it on a friend's boat at any time.

None of the several types of trolling rigs presently available meet all of these requirements. The ones offering the most capacity and benefits are too permanently mounted for quick removal, require tools for installation and removal, leave holes in the boat when removed, and are too cumbersome and bulky to stow and carry around with ease. The other choice is the smaller cluster type device, typically vertically extending, in which the number, positioning, and spacing of rod holders is limited physically. These consequently can not offer all of the previously outlined advantages which make a multiple rod holding device functionally desirable and user friendly.

It can be seen that there is a need in this field for a new type of universal multiple rod holding device. One that offers the combination of portability, flexibility, capacity, and simplicity of installation and use. Accordingly, it is to the provision of such therefore that the present invention is primarily directed.

BRIEF SUMMARY OF THE INVENTION

In a preferred form of the invention, a fishing rod holder and trolling rig having four rod holders laterally spaced apart from each other, two each pivotally mounted to a pair of supporting arms, which are in turn pivotally joined at one end to opposite sides of a common mounting base in such a manner that allows them to fold together for storage from the open, aligned, fishing position. While unfolding or folding, both the inside rod holders, those closest to the mounting base, and the outside rod holders, those closest to the outer end of the support arms, pivot to stay in parallel vertical planes. This is accomplished by means of a pair of alignment bars pivotally attached at one end to opposite sides of the common mounting base, and pivotally attached directly to the inside rod holders, and indirectly to the outside rod holders by means of a separate indexing plate, mounted on the same pivot and between the rod holder and support arm. The pivot points of the alignment bars and those of the support arms are equally offset at a common angle from one another, both at the base and at the rod holders, forming a parallelogram configuration, which dictates the position of the rod holders. The indexing plate interfaces with a protrusion from the rod holder in such a manner as to permit the outside holders to be turned outward, away from the inside holders, and captured in place at a specific angle, in order to increase the spread between the fishing lines when trolling, and regardless as to which position it is in, to push the rod holder back into a vertical plane as the support arm is folded. The mounting base, located in the center of the device when open, has a post centered on it protruding at an angle to the flat bottom of the base, providing the proper tilt of the installed rig for the preferred angle of the rod holders. This post is the same diameter as those found on the standard mount of the removable seats of bass fishing boats, permitting the invention to easily be mounted to the rear seat pedestal of this type of boat without the use of tools or the need to drill any holes. For non-standard mounts, after market adapters are available. A pair of adjustable straps, one end of each attached to a support arm and the other end hooked to one of the two rear lifting eyes or cleats common to these boats, keep the rig from turning and complete the installation. On other types of boats, the installation of a pedestal post and base would be required to accommodate the invention. When not in use the folded device can be stored in compartments provided in fishing boats for such gear.

BRIEF DESCRIPTION OF THE DRAWINGS

Hereinafter given by way of example only is a preferred form of the invention described with reference to the accompanying drawings in which:

FIG.2 is a front elevational view of the fishing rig of this invention opened for use showing four rod holders deployed in vertical planes.

FIG.3 is a front elevational view of the rig of FIG.2 showing the outside rod holders turned outward to increase the spread between fishing lines.

FIG.6 is a composite schematic view illustrating the transition between the open and folded positions of the rig.

FIG.7 is a side elevation view of the folded fishing rig shown installed in the rear seat pedestal of a typical bass fishing boat, angled to the rear of the boat.

FIG.8 is a side elevation view of the unfolded fishing rig shown installed in the rear seat pedestal of a typical bass fishing boat, the rod holders tilted toward the rear of the boat at the preferred angle.

DETAILED DESCRIPTION OF THE INVENTION

Figure 1:
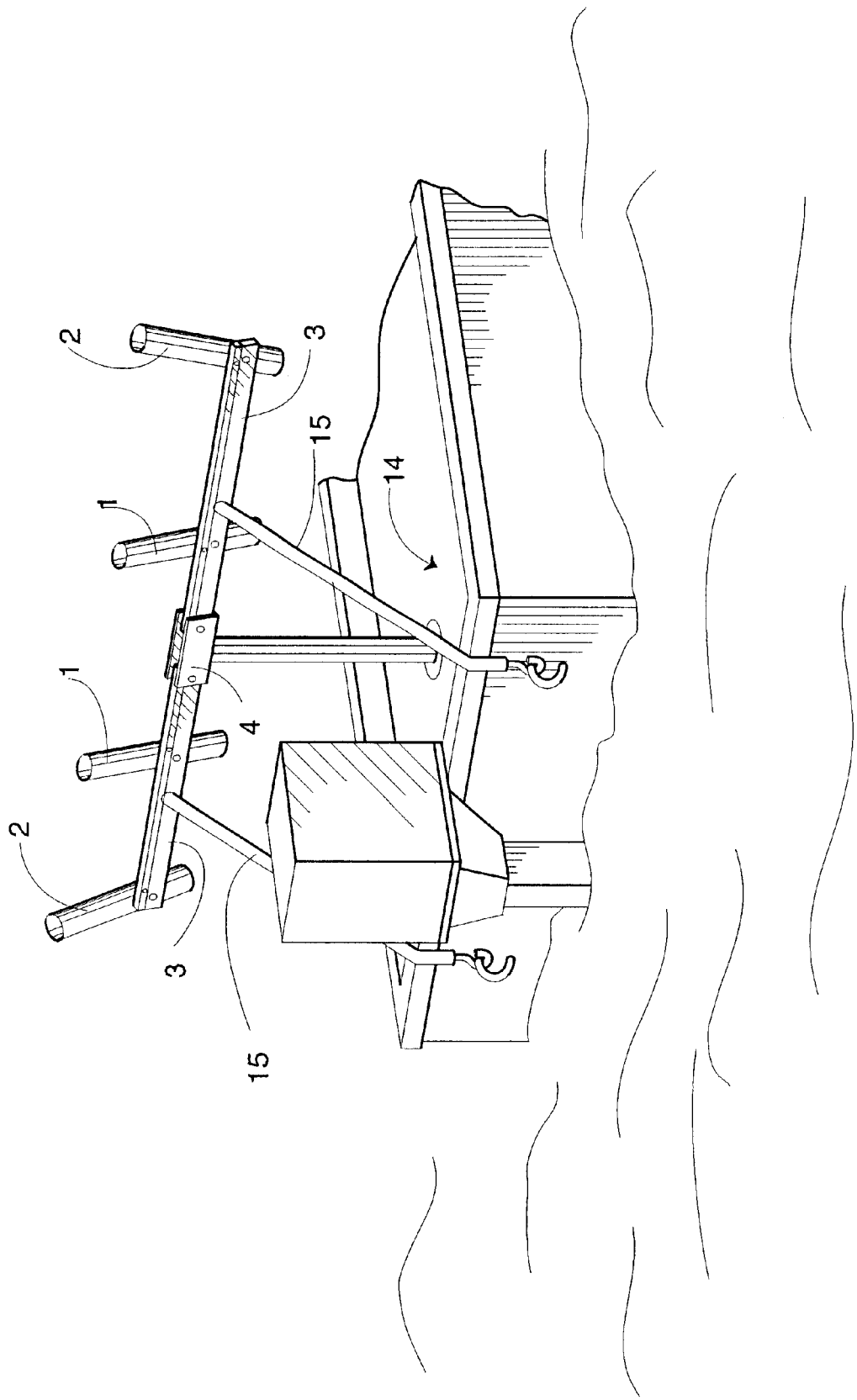
FIG.1 is a perspective view of the fishing rig of this invention mounted on the aft deck of a boat showing a plurality of fishing rod holders mounted thereon in operable orientation for trolling.
Figure 5:
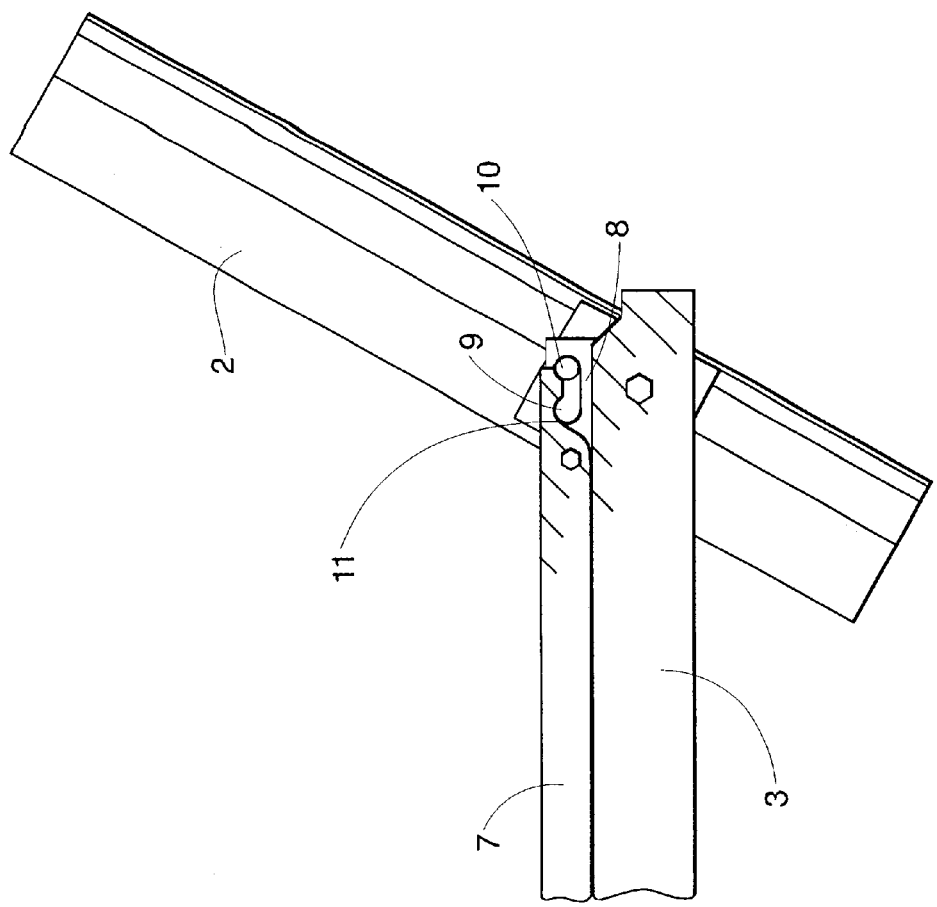
FIG.5 is a rear elevational view of an outside rod holder in FIG.3 showing the indexing mechanism of this example with the rod holder positioned at an angle.
Figure 4:
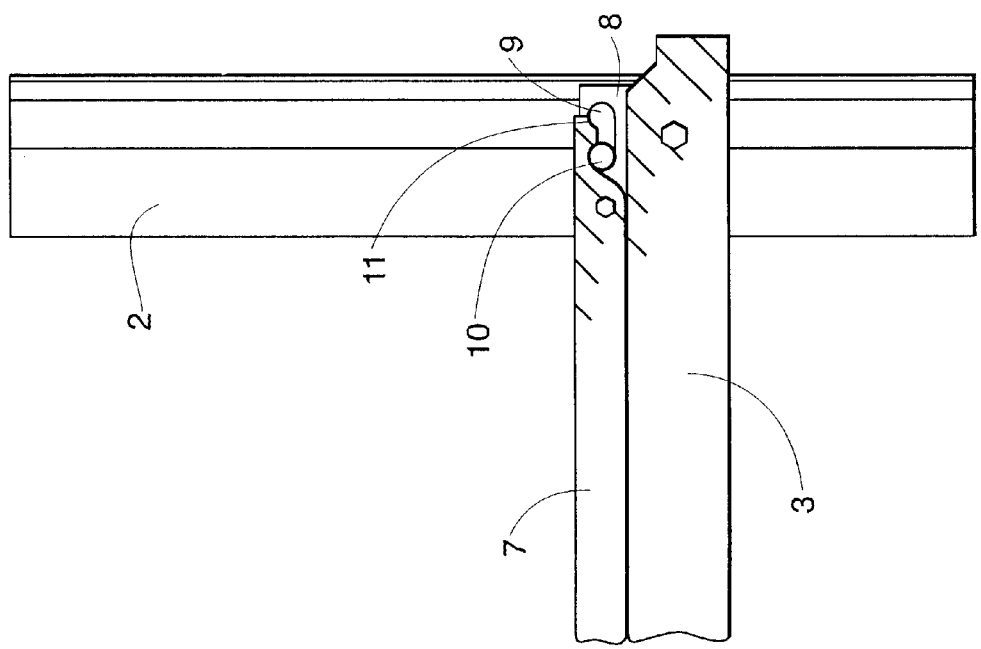
FIG.4 is a rear elevational view of an outside rod holder in FIG.2 showing the indexing mechanism of this example with the rod holder positioned in a vertical plane.

With reference to the drawings, FIGS.1 through 8, there is shown a preferred form of the fishing rod holder and trolling rig invention having two inner rod holders 1 and two outer rod holders 2. In other forms of the invention, fewer or more rod holders would be equally feasible embodying the same principals of design as this example. One set each of one inner 1 and one outer 2 rod holder are pivotally connected to two support arms 3 which are each pivotally connected 5 at one end to opposite sides of a common mounting base 4, allowing them to fold together for storage. Parallel and adjacent to the support arms 3 are two alignment bars 7, also pivotally connected 6 to opposite sides of the mounting base 4, just above and offset from the support arm connections 5. Each alignment bar 7 is pivotally connected to an inner rod holder 1 and to an indexing plate 8 mounted on the same pivot as the outer rod holder 2, between it and the support arm 3. The pivot points of the alignment bars 7 and those of the support arms 3 are equally offset at a common angle from one another, at the base 4 as well as at the rod holders 1 and index plates 8, forming a parallel configuration which dictates the position of the rod holders 1 & 2, causing them to pivot during folding or unfolding to stay in a vertical plane. The components themselves and the patterns of their pivot points on either side of the rig are mirror images of one another, as seen on the mounting base 4 at pivots 5 & 6.

In this example the indexing plate 8 contains a slot 9 which interacts with a post 10 protruding from the outer rod holder 2 in such a manner as to permit the holder 2 to be turned outward, pivoting away from the inner rod holder 1 a fixed number of degrees, and mechanically captured at that angle by means of notches 11 in the bottom of the end of the alignment bar 7. The post 10 is released by the notches 11 when the support arm 3 is raised slightly, since this action causes the alignment bar 7 and support arm 3 to begin a separation which increases to maximum at the 45 degree angle of the support arm 3. The indexing plate 8 additionally causes the rod holder 2 to pivot back to a vertical plane as the support arm 3 is raised to the folded position, by action of the end of slot 9 pushing on the post 10 as the index plate 8 rotates around the common pivot. The end of the support arm 3 acts as a stop for the post 10 to keep the rod holder 2 from over rotating as the support arm 3 is raised to the folded position. In other forms of the invention the interaction of the indexing plate 8 and the rod holder 2 can be accomplished by variations in their design to achieve the same results, i.e. a spring loaded snap button on the rod holder indexing into strategically spaced holes in the indexing plate as it is rotated.

The mounting base 4 has centered on its flat bottom a post 12 set at an angle to the bottom, tilted in a plane perpendicular to the aligned opened support arms 3 and away from the rod holder side. This post 12 is the same standard diameter as those found on the mount of the removable rear seat of bass fishing boats, permitting the rig to be mounted to the rear seat pedestal 13 simply by inserting the post 12 into the socket atop the pedestal 13 once the seat is removed. The pedestal 13, mounted to the deck 14 at the rear of the boat, provides the perfect placement for use of the rig in trolling. The angle of the post 12 when installed in the pedestal 13 establishes the proper tilt of the rig for the preferred angle of the rod holders 1 & 2. A pair of adjustable straps 15, one end of each attached to a support arm 3 and the other end hooked one each to the two rear lifting eyes or cleats common to these boats, keeps the rig from turning on the pedestal 13 and completes the installation. Mounting the rig in this manner, using the existing hardware found on bass boats, eliminates the need to drill any holes in the boat for the installation, an especially important factor in this particular market segment. On other types of boats the installation of a pedestal base, a common after-market item found in marine supply stores, would be required to accommodate the invention. Removing the rig for storage simply involves unhooking the straps from the boat, lifting the support arms into the folded position, and lifting the rig off of the pedestal. The folded device can be easily accommodated in storage compartments provided in these boats for fishing gear.

We claim:

1. A portable rig for removably mounting a plurality of fishing rods, each having a handle, in preferred operable orientations for fishing operations, comprising:

a pair of support arms having adjustment means for adjustable movement of said support arms between a spread open position with the said support arms spread apart from each other and a compact position with said support arms positioned closely adjacent to each other;

a mounting base coupled to said support arms;

a plurality of fishing rod holders coupled to said support arms and adapted to removably receive and support a handle end of a fishing rod; and mechanical linkage means wherein said rod holders are automatically deployed into operable orientations for fishing as said support arms are brought into said spread open position, and are automatically turned into alignment with their respective said support arms as said support arms are brought into said compact position.

2. The rig of claim 1 further comprising indexing means for providing optional positions of said rod holders for fishing operations which would allow further separation of the tips of said fishing rods.

* * * * *